Sept. 8, 1953
R. C. WELLWOOD
2,651,389
CAR BRAKE SLACK ADJUSTER
Filed June 26, 1951
2 Sheets-Sheet 1
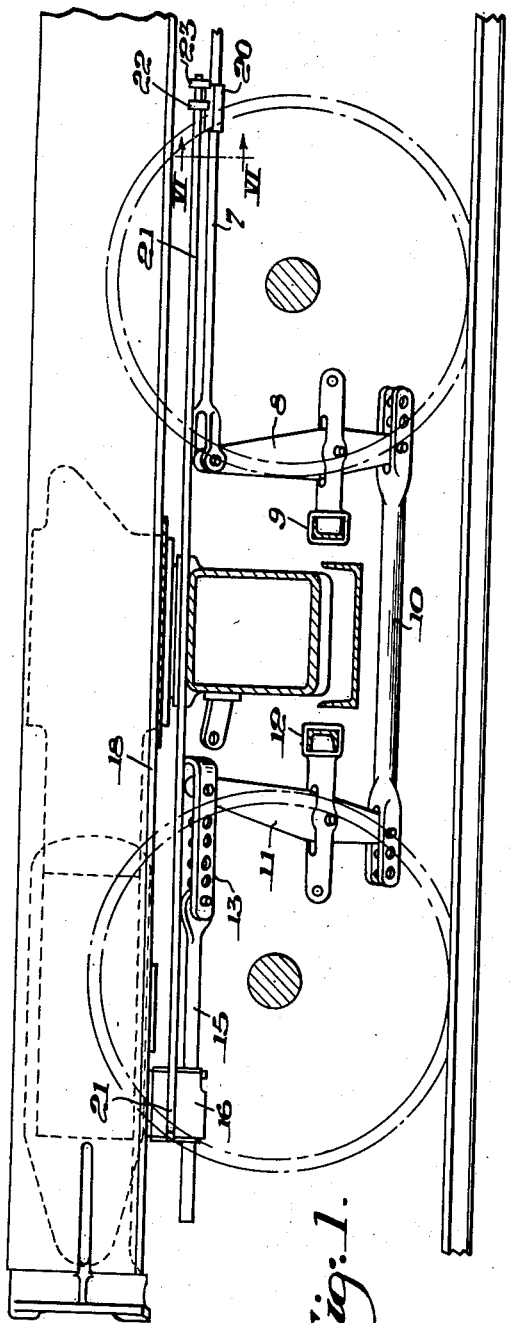
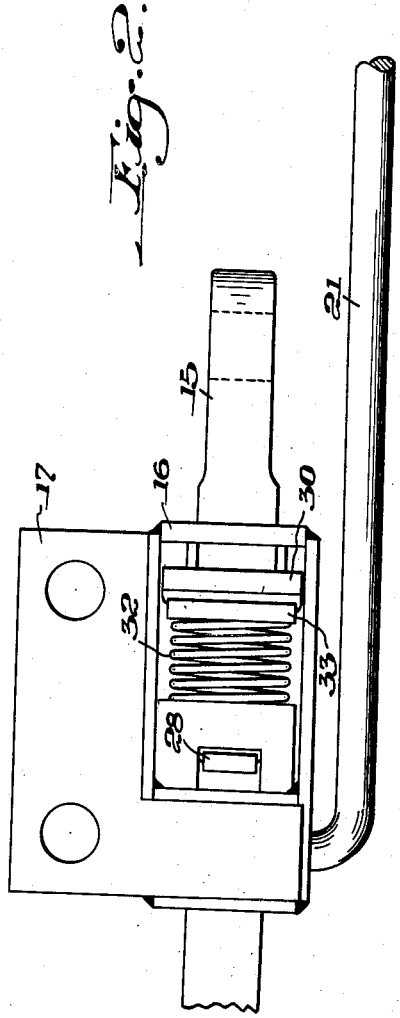
INVENTOR.
ROBERT C. WELLWOOD.
BY Archworth Martin
his ATTORNEY Sept. 8, 1953          R. C. WELLWOOD          2,651,389
CAR BRAKE SLACK ADJUSTER Filed June 26, 1951          2 Sheets-Sheet 2

INVENTOR.
ROBERT C. WELLWOOD.
BY Archworth Martin
his ATTORNEY.

Patented Sept. 8, 1953

2,651,389

UNITED STATES PATENT OFFICE 2,651,389

CAR BRAKE SLACK ADJUSTER

Robert C. Wellwood, Pittsburgh, Pa.

Application June 26, 1951, Serial No. 233,597

4 Claims. (Cl. 188—199)

My invention relates to automatic slack adjusters for railway car brakes, and has for one of its objects the provision of a self-adjusting dead lever guide that may be used instead of the standard manually adjustable devices normally used as a fulcrum for a dead lever on a freight car truck, and wherein upon each operation of the take-up device, there will be a taking up of more slack than that which occasioned operation of the device, thereby making possible several successive brake applications before another adjustment takes place.

Another object of my invention is to provide an adjusting device of the character referred to, which is of such simple and compact arrangement that it can be applied to standard car trucks and readily incorporated in standard brake rigging, without substantial changes in the rigging.

Still another object of my invention is to provide an adjusting device of the character referred to wherein a single spring is employed to render both the adjusting detent or pawl and the holding detent or pawl effective to serve their respective functions.

Figure 3:
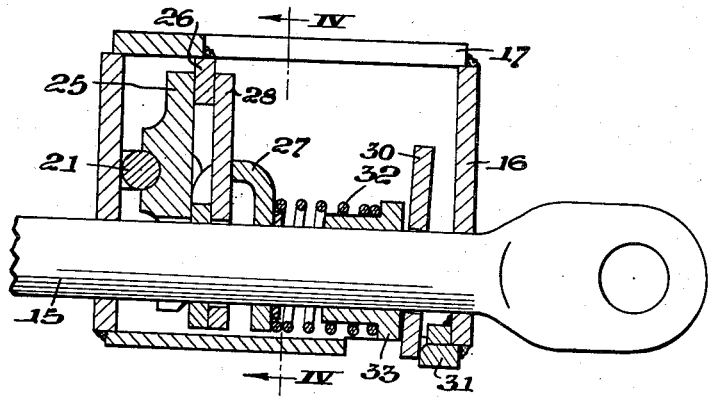
Figure 5:
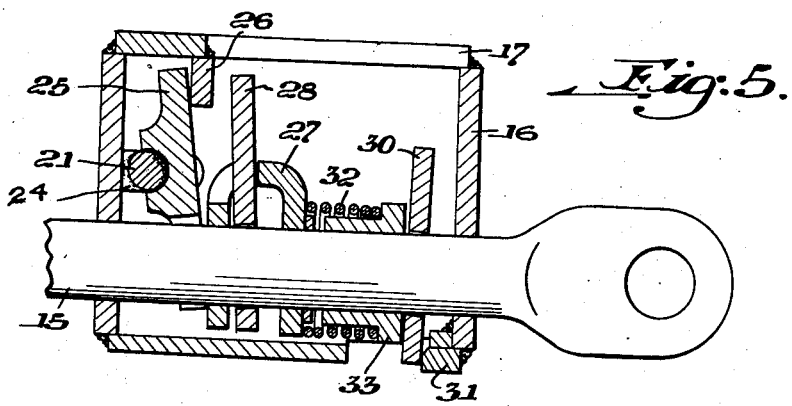
Figure 4:
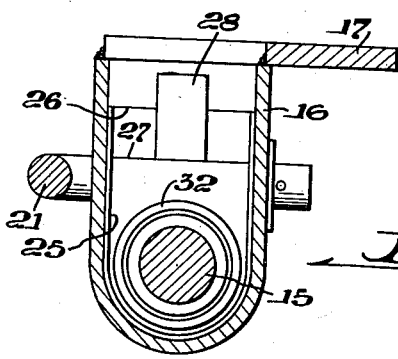
Figure 6:
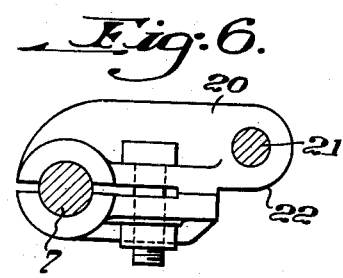

As shown in the accompanying drawings, Figure 1 is an elevational view partly in section, showing my apparatus applied to a car underframe and its truck; Fig. 2 is an enlarged plan view of a portion of the apparatus of Fig. 1; Fig. 3 is a longitudinal sectional view therethrough; Fig. 4 is a view taken on the line IV—IV of Fig. 3; Fig. 5 is a view similar to Fig. 3, but showing the operative parts of the slack adjusting mechanism moved to the position occupied thereby immediately preceding the taking up of the slack and movement of such mechanism to the position shown in Fig. 3, and Fig. 6 is an enlarged sectional view taken on the line VI—VI of Fig. 1.

As shown in Fig. 1, the apparatus is applied to a standard form of brake rigging that includes a brake cylinder pull rod or brake rod 7; a live brake lever 8 for operating a brake beam 9; a bottom rod 10, and a dead lever 11 for operating a brake beam 12. The usual dead lever guide 13 is connected to the upper end of the dead lever, to serve as a normally fixed fulcrum.

A slack-adjusting rod 15 serves to support the fulcrum member 13 against thrusts imparted thereto during application of the brakes, and my invention relates to the mechanism for automatically effecting adjustments of this rod, to shift the fulcrum point at the upper end of the lever 11.

The apparatus for effecting the said adjustments comprises a housing 16 having a bracket-like flange 17 that may suitably be bolted to a car sill 18, or other fixed member on the car body or on the car truck. The rod 15 extends through holes in the end walls of the housing 16 and is freely slidable therein.

When an excessive amount of slack develops through wear of the brake shoes or in the brake rigging, a bracket member 20 that is adjustably clamped to the brake rod 7, as shown more clearly in Fig. 6, will, upon application of the brakes, be moved along a pull rod 21 until a wing 22 on the bracket engages a shoulder 23 on the end of the rod 21, to shift the rod with respect to the housing 16 and to operate the mechanism within the housing as hereinafter explained.

The rod 21 extends into the housing from one side thereof, and a slot 24 is provided in the side wall of the housing to permit movement of the inwardly-bent end of the rod in a direction longitudinally of the housing. A yoke 25 is loosely supported on the bent end of the rod 21 and has rocking movement on a fixed shoulder 26 in the housing during longitudinal movements of the rod 21.

The slack adjusting rod 15 extends loosely through a yoke 27 into which extends an adjusting detent or pawl 28 that is tiltable relative to the rod 15 and will have binding engagement therewith when tilted in one direction. The slack adjusting rod 15 extends loosely through a locking detent or pawl 30 that has abutting engagement at its lower edge with a stop shoulder 31, this detent, when tilted in a clockwise direction about its seat 31, serving to have binding engagement with the rod 15, to anchor the same against shifting movement under pulls imparted to the rod 15 during application of the brakes.

A spring 32 has seating engagement with the yoke 27 and surrounds a sleeve or bushing 33 that has abutting engagement with the detent 30, the spring tending to rock this detent in a clockwise direction as indicated in Figs. 3 and 5, relative to the shoulder 31. The detent is therefore normally maintained in a locking or binding engagement with the slack adjusting rod 15.

When excessive slack develops in the brake rigging or through wear of the brake shoes, the brake rod 7 will be pulled so far to the right, during application of braking forces, that the lost motion normally existing between the shoulder members 22—23 will be taken up and the rod 21 shifted longitudinally to thereby rock the yoke 25 from an approximately vertical position to its tilted position as shown in Fig. 5. During this movement, it will shift the yoke 27 to compress the spring 32, and at the same time, will shift the detent 28 along the rod 15 as shown in Fig. 5. Upon release of the braking pressure and consequent shifting of the rod 7 toward the left, the rod 21 will be released to thereby permit expansion of the spring 32. During this expansion movement, the detent 28 is tilted to approximately the position shown in Fig. 5, thus causing it to bind upon the rod 15 and pull it to the left, the rod 15 being thereby drawn into the housing from the position shown in Fig. 5 to that shown in Fig. 3, thereby taking up the slack. The detent 30 will permit movement of the rod in this direction, because the rod tends to move the detent to a vertical position against the end of the sleeve 33 and hence into non-gripping position. Although the constant biasing imparted by the spring to the holding detent 30 gives it some frictional resistance to movement of the rod toward the left, this resistance never exceeds the power of the same spring to overcome it, because of the eccentric point of bearing between the spring and the detent afforded by the sleeve (between the fulcrum at 31 and the rod). When the parts reach the position shown in Fig. 3, the slack adjusting rod 15 is thereupon held against withdrawal, by the detent 30. It will be understood that initially the rod 15 will project a considerable distance from the housing 16, as indicated in Fig. 1.

For any extent of shifting movement of the rod 21, there will be such greater shifting of the rod 15 relative to the pawls as to take up a relatively large amount of slack. For example, a one-eighth inch travel of the rod 21 to the right will result in perhaps a quarter inch of take up on the rod 15, since the yoke 25 rocks on the shoulder 26 and the rod 21 is connected to the mid portion of the yoke, so that its lower end will move through a considerably greater distance than the rod.

In disassembling the device or when making wide range adjustments thereof, as when installing new brake shoes, the rod 15 can be released from the pawl 30 by inserting a tool into the housing from above and prying the upper edge of the pawl 30 backwardly, while the pawl 28 is released by its engagement with the shoulder 26.

The adjusting apparatus can, of course, be applied to other forms of brake rigging, wherein it is subjected to either compression or tension, merely by reversing the main rod in assembly. For example, if the brake rod 7 is extended to and connected to the lever 11 which will then become the live lever, the adjuster housing 16 will be moved to the other end of the truck and connected to the lever 8 which will thereupon be the dead lever. A single adjuster can be made to serve both car trucks by mounting it near the middle of the car as an anchorage for the body dead lever.

I claim as my invention:

1. A slack adjuster for railway brakes that have a dead lever, comprising a detent housing having a bracket extension for connection to a fixed point on a car, a slack-adjusting rod extending through the housing and slidably supported therein, means on a projecting end of the rod for pivotally connecting it to a dead lever, an adjusting detent and a locking detent in the housing, the detents being of plate-like form and the rod extending therethrough and tiltably supporting the same, an expansion spring interposed between the detents, pressure transmitting members interposed between the ends of the spring and the detents in position to tilt said detents in opposite directions and into gripping engagement with the rod, a stop member in the housing to one side of the rod and serving as a fulcrum for tilting of the locking detent under spring pressure, and a pull rod having connection with the adjusting detent to move the same along the adjusting rod against the spring pressure, there being a pressure-transmitting member to one side of the rod for tilting the adjusting detent into gripping engagement with the adjusting rod through expansion of the spring upon release of the pull rod, the pressure-transmitting member at the locking detent being in the form of a sleeve that loosely surrounds the adjusting rod, in position to bear against the locking detent at a point between the said fulcrum and the adjusting rod and being encompassed by the adjacent end of the spring.

2. A slack adjuster for railway brakes that have a dead lever, comprising a detent housing having a bracket extension for connection to a fixed point on a car, a slack-adjusting rod extending through the housing and slidably supported therein, means on a projecting end of the rod for pivotally connecting it to a dead lever, an adjusting detent and a locking detent in the housing, the detents being of plate-like form and the rod extending therethrough, expansion spring means interposed between the detents, pressure-transmitting members interposed between the ends of the spring and the detents in position to tilt said detents in opposite directions and into gripping engagement with the rod, a stop member in the housing to one side of the rod and serving as a fulcrum for tilting of the locking detent under spring pressure, a presser member tiltably supported in that end of the housing opposite to an locking detent for rocking movement about an axis adjacent to one of its edges, its other edge being engageable with the adjusting detent, and a pull rod having engagement with the presser member intermediate the ends thereof to move the adjusting detent along the adjusting rod against the spring pressure, there being a pressure-transmitting member to one side of the rod for tilting the adjusting detent into gripping engagement with the adjusting rod during expansion of the spring upon release of the presser member.

3. A slack adjuster for railway brakes that have a dead lever, comprising a detent housing having a bracket extension for connection to a fixed point on a car, a slack-adjusting rod extending through the housing and slidably supported therein, means on a projecting end of the rod for pivotally connecting it to a dead lever, an adjusting detent and a locking detent in the housing, the detents being of plate-like form and the rod extending therethrough and tiltably supporting the same, an expansion spring interposed between the detents, pressure transmitting members interposed between the ends of the spring and the detents in position to tilt said detents in opposite directions and into gripping engagement with the rod, a stop member in the housing to one side of the rod and serving as a fulcrum for tilting of the locking detent under spring pressure, and a pull rod having connection with the adjusting detent to move the same along the adjusting rod against the spring pressure, there being a pressure-transmitting member to one side of the rod for tilting the adjusting detent into gripping engagement with the adjusting rod through expansion of the spring upon release of the pull rod member, the pressure-transmitting member at the locking detent being in the form of a sleeve between the spring and the adjusting rod and positioned for engagement with said detent only at a point on the detent located eccentrically of the rod and intermediate the said fulcrum and the rod.

4. A slack adjuster for railway brakes that have a dead lever, comprising a detent housing having a bracket extension for connection to a fixed point on a car, a slack-adjusting rod extending through the housing and slidably supported therein, means on a projecting end of the rod for pivotally connecting it to a dead lever, an adjusting detent and a locking detent in the housing, the detents being of plate-like form and the rod extending therethrough, expansion spring means interposed between the detents, pressure-transmitting members interposed between the ends of the spring and the detents in position to tilt said detents in opposite directions and into gripping engagement with the rod, a stop member in the housing to one side of the rod and serving as a fulcrum for tilting of the locking detent under spring pressure, a pull rod having connection with the adjusting detent to move the same along the adjusting rod against the spring pressure, there being a pressure-transmitting member to one side of the rod for tilting the adjusting detent into gripping engagement with the adjusting rod through expansion of the spring, and a stop member positioned to be engaged by and effect rocking of the adjusting detent into non-gripping engagement with the rod upon expansion of the spring.

ROBERT C. WELLWOOD.

References Cited in the file of this patent

UNITED STATES PATENTS

| Number | Name | Date |
| --- | --- | --- |
| 1,227,954 | Sauvage | May 29, 1917 |
| 1,453,857 | Sauvage | May 1, 1923 |
| 1,474,091 | Sauvage | Nov. 13, 1923 |
| 1,723,527 | Sauvage | Aug. 6, 1929 |
| 1,991,262 | Sauvage | Feb. 12, 1935 |